United States Patent [19]

Layton

[11] Patent Number: 4,848,906

[45] Date of Patent: Jul. 18, 1989

[54] MULTIPLEXED FIBER OPTIC SENSOR

[75] Inventor: Michael R. Layton, Newbury Park, Calif.

[73] Assignee: Litton Systems, Inc., Beverly Hills, Calif.

[21] Appl. No.: 9,922

[22] Filed: Feb. 2, 1987

[51] Int. Cl.⁴ .............................................. G01B 9/02
[52] U.S. Cl. .................................. 356/345; 250/227; 356/345; 356/351
[58] Field of Search ................ 356/345, 351; 250/227

[56] References Cited

U.S. PATENT DOCUMENTS

| | | | |
|---|---|---|---|
| 3,990,036 | 11/1976 | Savit | 340/15.5 TS |
| 4,360,272 | 11/1982 | Schmadel et al. | 356/352 |
| 4,368,981 | 1/1983 | Ozeki | 356/352 |
| 4,436,425 | 3/1984 | Cole | 356/361 |
| 4,443,700 | 4/1984 | Macedo et al. | 250/227 |
| 4,505,587 | 3/1985 | Haus et al. | 356/345 |
| 4,552,457 | 11/1985 | Giallorenzi | 356/345 |
| 4,697,926 | 10/1987 | Youuggist et al. | 356/351 X |

FOREIGN PATENT DOCUMENTS

| | | |
|---|---|---|
| 0023345 | 2/1981 | European Pat. Off. . |
| 3224775 | 1/1983 | Fed. Rep. of Germany . |
| 2096762 | 10/1982 | United Kingdom . |
| 79/00377 | 6/1979 | World Int. Prop. O. . |
| 8301303 | 4/1985 | World Int. Prop. O. ......... 356/350 |

OTHER PUBLICATIONS

Dandridge, et al., "Phase Compensation in Interferometric Fiber Optic Sensors", Optics Letters, vol. 7, No. 6, Jun. 1982, pp. 279-281.
Nelson et al., "Passive Multiplexing Systems For Fiber Optic Sensors", Applied Optics, 9/1980, pp. 2917-2920.
Kersey et al., "Demodulating Scheme Fibre Interferometric Sensors Employing Laser Frequency Switching", Electronics, Lett. vol. 19, No. 3, pp. 102-103. (2/13/83).
Nelson et al., "Passive Techniques For Fiber Optic Sensor Systems", I.F.O.C., 3/1981, pp. 27-30.
Brooks et al., "Fiber-Optic Interferometric Sensor Arrays With Freedom from Source Phase-Induced Noise", Optics Letters, Jul. 86, vol. 11, No. 7, pp. 473-475.

Primary Examiner—Davis L. Willis
Assistant Examiner—Matthew W. Koren
Attorney, Agent, or Firm—Lynn & Lynn

[57] ABSTRACT

An all fiber optic hydrophone or sensor array has significant size, cost, reliability, and operational advantages over other hydrophone arrays. The array comprises a distributed network of appropriately coiled optical fiber encased in commercially available marine cable. The terminal end of the sensor array preferably contains a modulated miniature solid-state laser diode and photodetector matrix which mate to power and multiplexing electronics. The distributed sensor assembly itself is entirely passive. The hydrophone array comprises an optical signal source and at least one transmitting optical fiber for guiding signals output from the optical signal source. The array further includes a plurality of sensing interferometers coupled to the transmit optical fiber and means for measuring differential changes in the optical path of each sensing interfereometer. The hydrophone array comprises means for superimposing signals output from each sensing interferometer, and a detector for converting optical signals in the receive fiber into electrical signals. The signal processing system in the array includes a compensating interferometer having optical phase modulating means formed in one arm thereof.

6 Claims, 9 Drawing Sheets

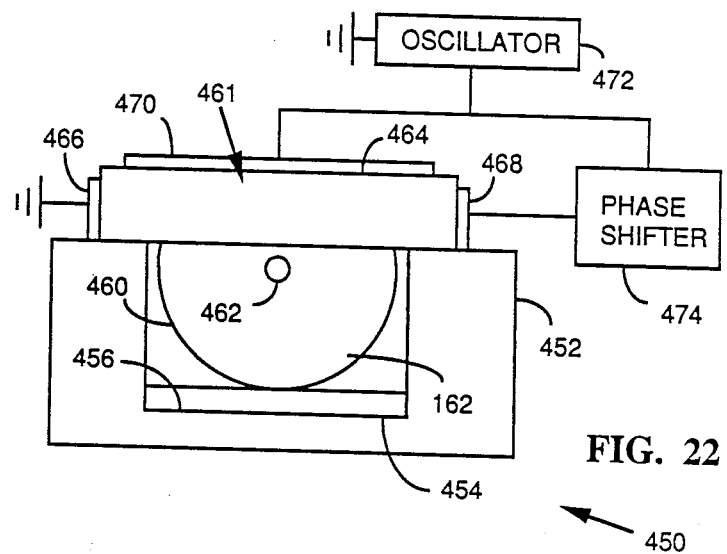
FIG. 22
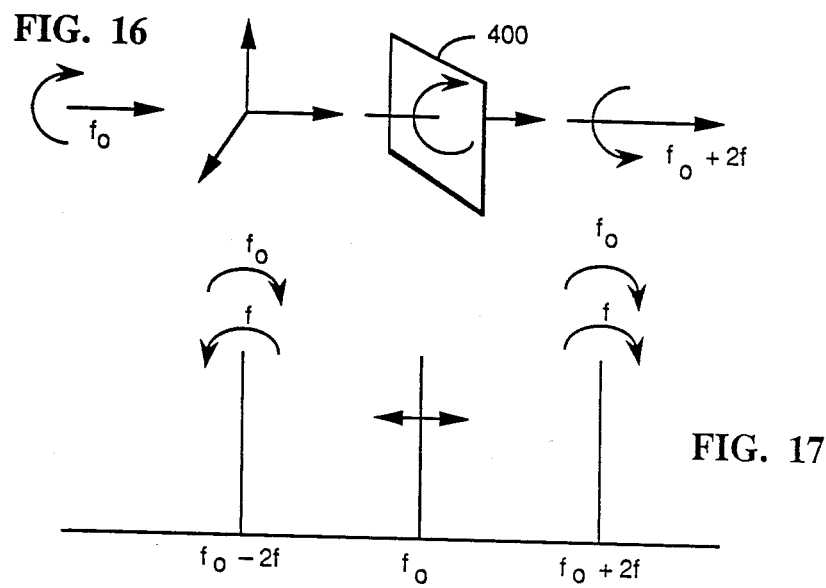
FIG. 16
FIG. 17

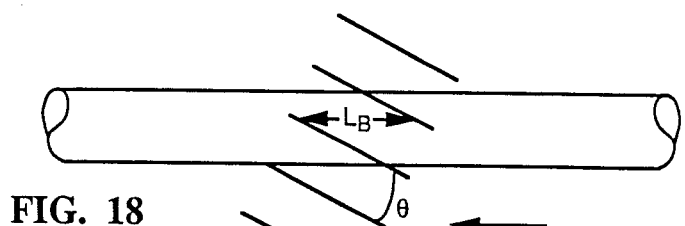
FIG. 18
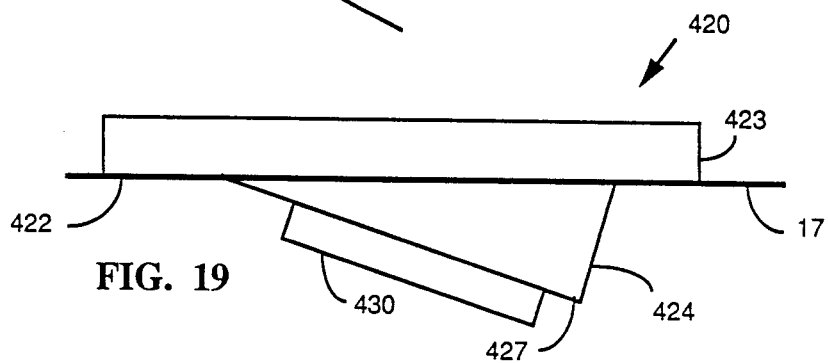
FIG. 19
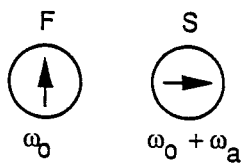
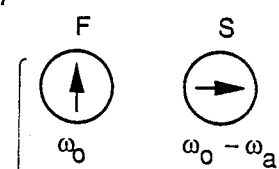
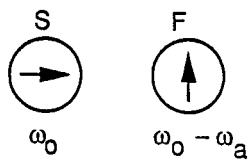
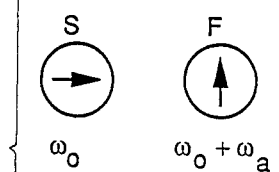
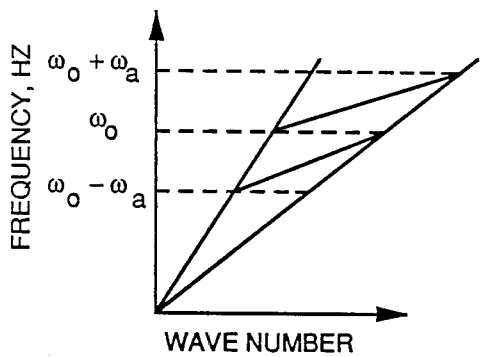
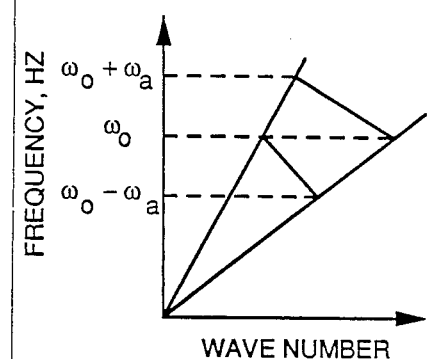
FIG. 20  FIG. 21

MULTIPLEXED FIBER OPTIC SENSOR

BACKGROUND OF THE INVENTION

This invention relates generally to apparatus and methods for sensing physical phenomena and particularly to fiber optic sensors that use interferometers to sense changes in physical phenomena. Still more particularly, this invention relates to fiber optic interferometric sensors that respond to perturbations such as acoustic wavefronts by producing a phase difference in two light beams propagated by fiber optic material. This invention relates generally to acoustic sensors and particularly to underwater acoustic sensors. More particularly this invention relates to a low power, all fiber optic acoustic sensor array.

A hydrophone array or acoustic sensor array is an integral, self-contained linear array of hydrophones on a single cable. Conventionally, such an array is made up of electromechanical transducer elements, principally piezo-electric devices, which generate electrical signals in response to pressure variations. These conventional sensors typically are active devices that require many electrical wires or cables. These sensors have the disadvantage of being susceptible to electrical noise and signal cross talk.

A light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagatge without severe attenuation. The waves having field components that propagate unattenuated are called normal modes. A single mode fiber will propagate only one spatial distribution of energy, that is, one normal mode, for a signal of a given frequency.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as microphones, hydrophones, magnetometers, accelerometers and electric current sensors.

Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

Long-term research activity, most prominently at the U.S. Naval Research Laboratory, suggests the alternate use of optical interferometric sensors, devices made practical by the availability of modern high-quality optical communication fiber. Such sensors have demonstrated greatly improved acoustical performance, and offer the unique advantages of high sensitivity and freedom from electrical noise and signal cross talk.

Laboratory demonstrations of fiber optic interferometric acoustical transducers have generally involved relatively complex and bulky associated electronics, including laser sources, piezoelectric optical modulators, and sophisticated photodetectors. Such demonstration systems have not appeared particularly attractive in the context of practical, deployable military acoustic systems.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will proagate without severe attenuation. The waves having field components that propagate unattenuated are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. If only the electric field vector is perpendicular to the direction of propagation, which is usually called the optic axis, the wave is a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode.

None of the normal modes require a definite direction of the field components; and in a TE mode, for example, the electric field may be in any direction that is perpendicular to the optic axis. The direction of the electric field vector in an electromagnetic wave is the polarization of the wave. In general, a wave will have random polarization in which there is a uniform distribution of electric field vectors pointing in all directions permissible for a given mode. If all the electric field in a wave points in only a particular direction, the wave is linearly polarized. If the electric field consists of two orthogonal electric field components of equal magnitude, the electric field is circularly polarized, because the net electric field is a vector that rotates around the optic axis at an angular velocity equal to the frequency of the wave. If the two linear polarizations are unequal, the wave has elliptical polarization. In general, any arbitrary polarization can be represented by the sum of two orthogonal linear polarizations, two oppositely directed circular polarizations or two counter rotating elliptical polarizations that have orthogonal major axes.

The boundary between the core and cladding is a dielectric interface at which certain well-known boundary conditions on the field components must be satisfied. For example, the component of the electric field perpendicular to the interface must be continuous. A single mode optical fiber propagates electromagnetic energy having an electric field component perpendicular to the core-cladding interface. Since the fiber core has an index of refraction greater than that of the cladding and light impinges upon the interface at angles greater than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the "evanescent field."

The velocity of an optical signal depends upon the index of refraction of the medium through which the light propagates. Certain materials have different refractive indices for different polarizations. A material that has two refractive indices is the to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a velocity difference between the two polarizations.

SUMMARY OF THE INVENTION

The present invention provides a relatively simple all fiber optic hydrophone or sensor array that has significant size, cost, reliability, and operational advantages over other hydrophone arrays. The invention may comprise a distributed network of appropriately coiled optical fiber encased in commercially available marine cable. The terminal end of the sensor array preferably contains a modulated miniature solid-state laser diode and photodetector matrix which mate to power and multiplexing electronics. The distributed sensor assembly itself is entirely passive, containing only optical fiber without any electrical elements or conducting wire.

A low power all fiber optic hydrophone array according to the invention preferably comprises an optical signal source and at least one a transmitting optical fiber for guiding signals output from the optical signal source. The invention further preferably includes a plurality of sensing interferometers coupled to the transmit optical fiber with each sensing interferometer having a short arm and a long arm, a receive fiber coupled to each of the sensing optical fibers; and means for measuring differential changes in the optical path of each sensing interfereometer.

The measuring means included in the hydrophone array hydrophone array of the invention preferably comprises means for superimposing signals output from from each sensing interferometer, and a detector for converting optical signals in the receive fiber into electrical signals.

The measuring means preferably further includes a receive interferometer formed in the receive fiber between the sensing fibers and the detector, and optical phase modulating means formed in the receive interferometer.

Each sensing interferometer in the hydrophone array of the invention preferably includes a pair of sensing optical paths having a predetermined path difference therebetween. The receive interferometer has a pair of optical paths that preferably have the same path difference as the predetermined path difference of each sensing interferometer.

The measuring means in the hydrophone array of the invention may further include optical phase frequency shifting means formed in the receive interferometer.

The hydrophone array of the invention may further include a detector array that includes a detector corresponding to each sensing interferometer for producing output electrical signals indicative of optical signals output from each of the sensing interferometers and a first mixing array connected to the detector array to receive electrical signals output therefrom. The hydrophone array may also include a second mixing array connected to the detector array to receive electrical signals output therefrom, oscillator means for driving the frequency shifter, the oscillator means being connected to the second mixing array, the second mixing array providing outputs indicative of the sines of the phase differences of the sensing interferometers, and phase shifting means connected between the oscillator means and the first mixing array, the first mixing array providing outputs indicative of the cosines of the phase differences of the sensing interferometers.

The method for forming a low power all fiber optic hydrophone array according to the invention preferably comprises the steps of providing an optical signal source; guiding signals output from the optical signal source along a transmit optical fiber; coupling a plurality of sensing interferometers to the transmit optical fiber; forming each sensing interferometer to have a short arm and a long arm; coupling a receive fiber to each of the sensing optical fibers; and measuring differential changes in the optical path of each sensing interfereometer.

The measuring step in the method of the invention for producing a hydrophone array preferably comprises the steps of superimposing signals output from from each sensing interferometer and converting optical signals in the receive fiber into electrical signals.

The measuring step in the method of the invention may further include forming a receive interferometer in the receive fiber between the sensing fibers and the detector, and forming optical phase modulating means in the receive interferometer.

The method the invention may further include the steps of forming each sensing interferometer to have a pair of sensing optical paths with a predetermined path difference therebetween, and forming the receive interferometer to have a pair of optical paths that have the same path difference as the predetermined path difference of each sensing interferometer.

The measuring step in the method of the present invention may further include the step of forming optical frequency shifting means in the receive interferometer.

The method of the invention for forming a fiber optic hydrophone array may further include the steps of forming a detector array that includes a detector corresponding to each sensing interferometer for production output electrical signals indicative of optical signals output from each of the sensing interferometers, and connecting a first mixing array to the detector array to receive electrical signals output therefrom. The method of the invention may further include connecting a second mixing array to the detector array to receive electrical signals output therefrom, driving the frequency shifter with oscillator means, connecting the oscillator means to the second mixing array so that the second mixing array provides outputs indicative of the sines of the phase differences of the sensing interferometers, and connecting phase shifting means between the oscillator means and the first mixing array so that the first mixing array provides outputs indicative of the cosines of the phase differences of the sensing interferometers.

BRIEF DESCRIPTION OF THE DRAWINGS

FIGS. 16 and 17 illustrate the effect of a frequency shifter on an optical wave;

FIG. 18 illustrates an acoustic wavefront impinging upon an optical fiber;

FIG. 19 illustrates a structure for an acoustooptic frequency shifter;

FIGS. 20 and 21 illustrate the effect of the acoustooptic frequency shifter of FIG. 19 on an optical signal;

FIG. 22 illustrates a second structure for a frequency shifter that may be used in the arrays of FIGS. 1 and 7;

DESCRIPTION OF THE PREFERRED EMBODIMENT

Figure 1:
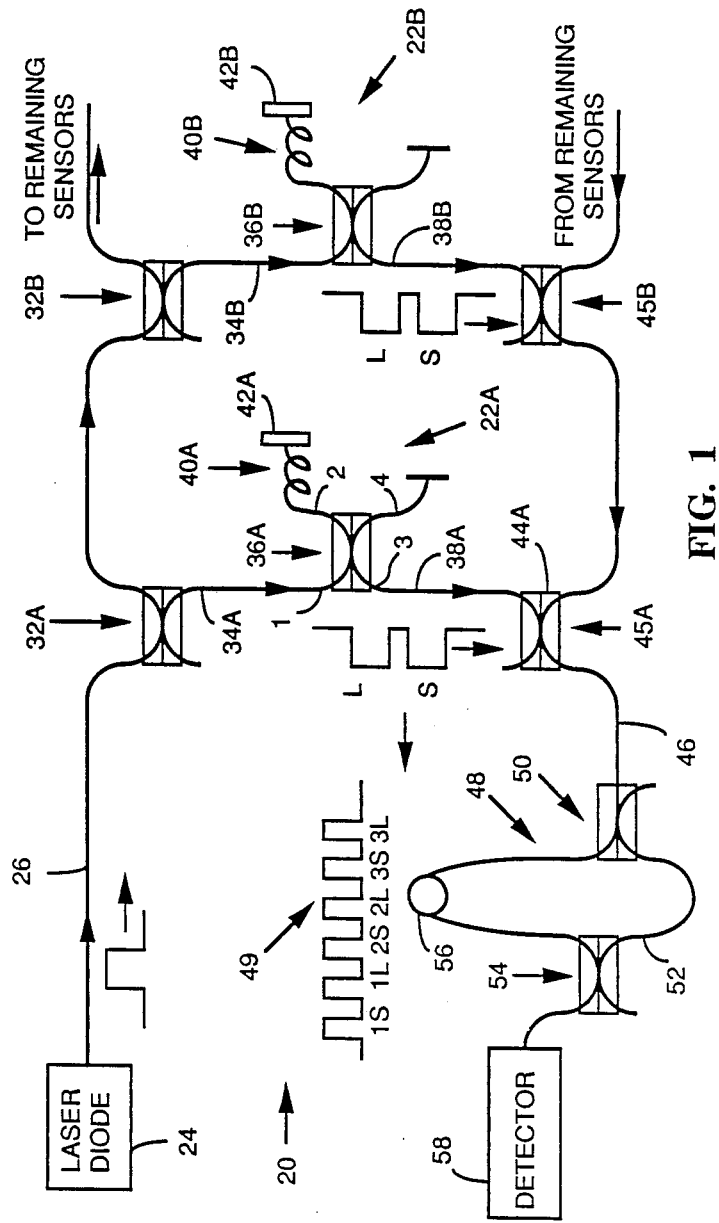
FIG. 1 is a schematic illustration of a multiplexed fiber optic sensor system according to the invention.

Referring to FIG. 1, a fiber optic sensor 20 includes a plurality of mismatched pathlength interferometers 22A, 22B, etc., which are shown to be Michelson interferometers. The fiber optic sensor 20 is not limited to the use of a Michelson interferometer, but may include any type of mismatched pathlength interferometer, such as a Mach-Zehnder interferometer. The structures and operational characteristics of both the Michaelson and Mach-Zehnder interferometers are described in detail subsequently.

Figure 5:
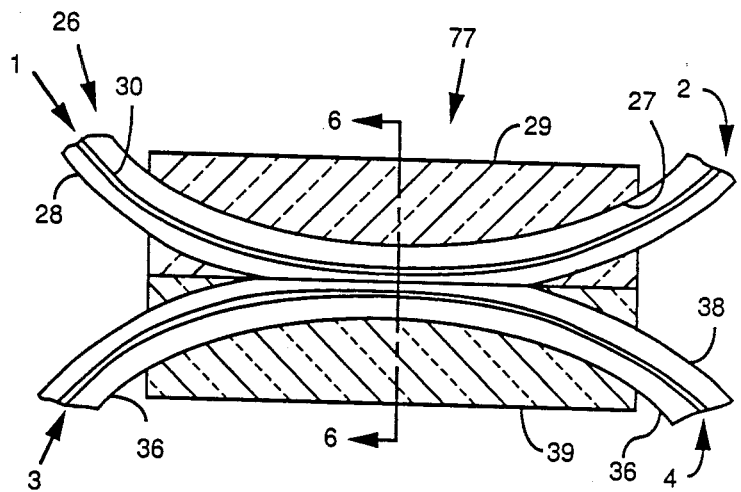
FIG. 5 is a cross sectional view of a fiber optic directional coupler that may be included in the sensor array of FIG. 1.
Figure 6:
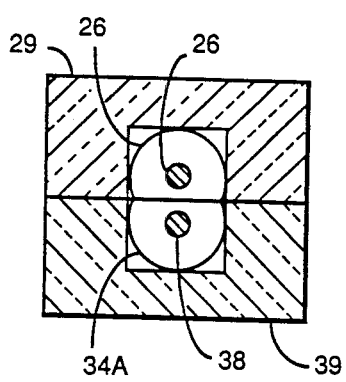
FIG. 6 is a cross sectional view along line 6—6 of FIG. 5.

An optical signal source 24, which may be a laser diode, provides an optical signal to an optical fiber 26. Referring to FIGS. 5 and 6, the optical fiber 26 preferably has a cladding 28 surrounding a core 30 that guides a single mode of electromagnetic energy. The input signal propagates in the optical fiber 26 to a directional coupler 32A. A first portion of the optical signal incident upon the coupler 32A propagates through it, remaining in the fiber 26; and a second portion of the signal cross couples into an optical fiber 34A.

The optical fiber 34A then guides the signal to an optical coupler 36A. The coupler 36A, an optical fiber 38A, a portion 40A of the optical fiber 34A extending through the coupler 36A and a mirror 42A attached to the end of the fiber portion 40A comprise the Michelson interferometer 22A.

The interferometer 22A provides a signal to a fiber optic coupler 44A, which couples light between the fiber 38A and a receive fiber 46. The coupler 32A, the optical fiber 34A, the interferometer 22A, the optical fiber 38A and the coupler 44A comprise a leg 45A of the fiber optic sensor system 20.

The signal coupled into the receive fiber 46 propagates to a processing Mach-Zehnder interferometer 48 that comprises an optical coupler 50, the receive fiber 46, an optical fiber 52, an optical coupler 54 and a phase modulator 56. The receive fiber 46 and the optical fiber 52 extend between the optical couplers 50 and 54. The phase modulator 56 is in the portion of the receive fiber 46 that is between the optical couplers 50 and 54.

The optical coupler 50 couples part of the signal from the receive fiber 56 into the optical fiber 52. The optical coupler 54 combines the portion of the signal remaining in the receive fiber 46 with the portion that was coupled into the optical fiber 52. A detector 58 produces an electrical signal indicative of the interference pattern formed by the superposition of the optical signals guided by receive fiber 46 and optical fiber 52.

The portion of the signal from the optical signal source 24 remaining in the optical fiber 26 beyond the coupler 32A propagates to a coupler 32B. The optical coupler 32B couples a portion of the light incident thereon into an optical fiber 34B, which guides the light to the Michelson interferometer 22B. The interferometer 22B comprises a coupler, a portion 40B of the fiber 34B, a mirror 42B on the end of the fiber portion 40B and an optical fiber 38B. The output of the interferometer 22B is input to a coupler 44B, which couples light from the interferometer 22B into the receive fiber 46. The optical fiber 32B the optical fiber 34B, the interferometer 22B, the optical fiber 38B and the coupler 44B comprise a leg 45B of the fiber optic sensor system 20.

The fiber optic sensor system 20 may include any number of legs 45A, 45B, etc. with couplers 32A, 32B, etc., optical fibers 34A, 34B, etc., interferometers 22A, 22B, etc., optical fibers 38A, 38B, etc., and couplers 44A, 44B, etc. A preferred embodiment of the fiber optic sensor system 20 for use as an acoustic sensor includes eight such legs.

All of the optical couplers 32, 36, 44, 50 and 54 may have substantially identical structures; therefore, the following description of the optical coupler 32A is applicable to all optical couplers included in the hydrophone system 20 when the optical fibers 26, 34, 38 46, 48 and 52 are single mode fibers.

A symmetrical fiber optic directional coupler suitable for use in single mode fiber implementations of the invention is described in the Mar. 29, 1980 issue of *Electronics Letters*, Vol. 18, No. 18. pp. 260-261 and in U.S. Pat. No. 4,493,518, issued Jan. 15, 1985, to Shaw et al. That patent is assigned to the Board of Trustees of the Leland Stanford Junior University. The disclosure of of that patent is hereby incorporated by reference into this disclosure.

Referring to FIGS. 5 and 6, optical power can be coupled between two optical fibers 26 and 34A by the evanescent fields that extend outside the cores. This effect has been used to make integrated-optic couplers where the dielectric waveguides can be fabricated in close enough proximity for evanescent coupling. The fiber 26 has a core 30 and a cladding 28, and the fiber 34A has a core 38 and a cladding 36. The evanescent field in optical fibers is buried deep within the fiber cladding to achieve low loss. Therefore, some of the claddings 28 and 36 must be removed to expose the evanescent fields of the guiding fiber core 30 and 38, respectively. The couplers used in the present invention may be formed by using a mechanical lapping technique to expose the evanescent fields.

Referring to FIG. 5, the optical fiber 26 is bonded into a curved slot 27 in a quartz block 29. The block 29 and fiber cladding 28 are then ground and polished to within a few microns of the fiber core 30. The polished block 29 and fiber 26 comprise a coupler half 77, and a polished block 39 and the fiber 34A comprise a coupler half 79. Placing the two coupler halves 77 and 79 in contact so that the polished faces confront each other places the cores 30 and 38 in close proximity. An index-matching oil is then inserted by a capillary action between the polished coupler halves 77 and 79 to match the cladding index to the refractive index of the block. This oil also acts as a lubricant to allow one coupler half to be slid over the other, as shown in FIG. 6, to change the core-to-core separation and the net coupling.

Referring to FIG. 5, consider light traveling from ports 1 and 3, interacting in the coupling region, and exiting from ports 2 and 4. The input electric fields in fibers 1 and 2 can be expressed as $$E_i(x,y,z,t) = \tfrac{1}{2} E_i(z) a(x,y) e^{j(\beta z - \omega t)} + \text{c.c.}, \quad i=1,2 \qquad (1)$$

where $E_i(z)$ is the complex field amplitude, $\omega$ is the optical frequency, $\beta$ is the fiber propagation constant, and c.c. is the complex conjugate. $E(z)$ changes with z only in the coupling region. The vector $a(x,z)$ is the modal field distribution normalized to unity:

$$\int\int_{-\infty}^{+\infty} a(x,y) a^*(x,y) dx dy = 1. \qquad (2)$$

In general, for a single-mode fiber there are two possible orthogonal field distributions, a and b, representing two orthogonal states of polarization, where $$\int\int_{-\infty}^{+\infty} a(x,y) b^*(x,y) dx dy = 0 \qquad (3)$$

This analysis always assumes that only one polarization mode is present and does not consider the field distribution any further. More generally, if the directional coupler is polarization independent, any well defined input state of polarization (expressed as a linear combination of a and b) can be thought of as a single "polarization mode." Again, the field distribution need not be considered.

When the fiber guides are evanescently coupled, the z dependence of the complex fields in the optical fibres 1 and 2 follows standard coupled-mode relations:

$$dE_1(z)/dz = jk E_2(z) \qquad (4)$$

$$dE_2(z)/dz = jk E_1(z). \qquad (5)$$

A constant coupling coefficient per unit length k is assumed. The two fiber guides are considered to be identical, and therefore have identical propagation constants $\beta$. If the coupling start at z=0 with the initial amplitudes of $E_1(0)$ and $E_2(0)$ in fibers 26 and 34A, respectively, then for a lossless coupler $$d/dz(|E_1(z)|^2 + |E_2(z)|^2) = 0 \qquad (6)$$

Under these conditions the solutions to Equations (30) and (31) are $$E_1(z) = E_1(0) \cos kz + j E_2(0) \sin kz \qquad (7)$$

$$E_2(z) = j E_1(0) \sin kz + E_2(0) \cos kz. \qquad (8)$$

In the directional coupler described above, the coupling is not constant over the interaction region due to the curving of the fibers 26 and 34A. The coupling coefficient is a function of z with a maximum value of $k_o$ where the fibers are closest. The coupler can be considered as having an effective coupling length $L_c$ with a constant coupling coefficient $k_o$ given by $$k_o L_c = \int_{-\infty}^{+\infty} k(z) dz \quad (9)$$

Therefore, after the coupled-mode interaction, the complex field amplitudes in the two fibers are $$E_1(L_c) = E_1(0) \cos k_o L_c + j E_2(0) \sin k_o L_c \quad (10)$$

$$E_2(L_c) = j E_1(0) \sin k_o L_c + E_2(0) \cos k_o L_c \quad (11)$$

In many applications, the parameter of interest is the total coupled power. Let $\sin k_o L_c \equiv \kappa^{\frac{1}{2}}$ and thus $\cos k_o L_c = (1-\kappa)^{\frac{1}{2}}$. Further, the amplitudes $E_1(0)$ and $E_3(0)$ can be regarded as the field amplitudes at two input ports, 1 and 3 while the amplitudes $E_2(L_c)$ and $E_4(L_c)$ can be the field amplitudes at the two output ports 2 and 4. Defining $E_1 \equiv E_1(0)$, $E_3 \equiv E_3(0)$, $E_2 \equiv E_1(L_c)$, and $E_4 \equiv E_3(L_c)$, yields $$E_2 = (1-\kappa)^{\frac{1}{2}} E_1 + j\kappa^{\frac{1}{2}} E_3 \quad (12)$$

$$E_4 = j\kappa^{\frac{1}{2}} E_1 + (1-\kappa)^{\frac{1}{2}} E_3 \quad (13)$$

Consider the case where $E_3 = 0$, so that light is present only in fiber 26.
Equations (12) and (13) reduce to $$E_3 = (1-k)^{\frac{1}{2}} E_1 \quad (14)$$

$$E_4 = j k^{\frac{1}{2}} E_1 \quad (15)$$

When $\kappa = 0$, no coupling occurs between the two fibers. With $\kappa = 0.5$, $|E_2|^2 = |E_4|^2$ and half the power has been coupled from the fiber 26 into the fiber 34A. When $\kappa = 1$, $E_2 0$ and $|E_4|^2 = |E_1|^2$ and all the power has been coupled. Therefore, $\kappa$ is the intensity coupling constant.

For the case described by Equations 14 and 15, the phase of the light in port 4 is greater than in port 2 by $\pi/2$ as indicated by the j factor in the expression for $E_4$. The complete output fields are defined as $E_2$ and $E_4$, as in Equation (1). If $E_2$ has a phase term of $e^{j(\beta z - \omega t)}$, then $E_4$ has a phase term of $e^{j(\beta z - \omega t + \pi/2)} = e^{j(\beta z - \omega[t - \pi/(2\omega)])}$. Thus $E_4$ lags $E_2$ in time. Physically, the coupling of power from fiber 26 to fiber 34A occurs because the evanescent electric field in fiber 26 induces a linear polarization in fiber 34A at the optical frequency in phase with the evanescent electric field of fiber 26. The linear polarization in fiber 34A is the driving term in Maxwell's equations and generates an electromagnetic wave in fiber 34A that lags this polarization in time. The driving polarization and driven field in fiber 26 have the proper phase relationship for a power exchange from the induced polarization to the field.

Figure 9:
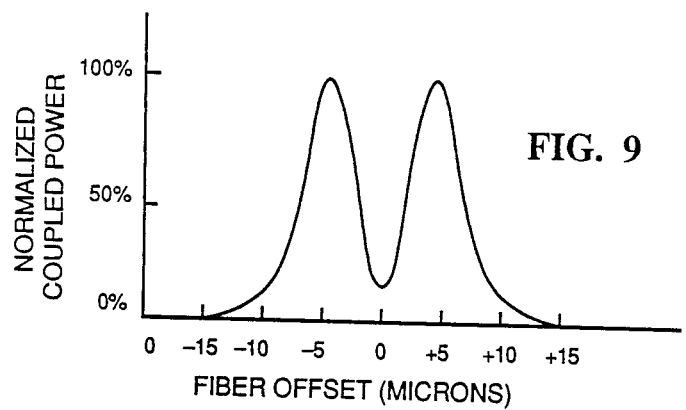
FIG. 9 graphically illustrate coupling characteristics for a fiber optic coupler that may be included in the arrays of FIGS. 1 and 7.

A detailed theoretical and experimental study of this type of coupler was carried out by M. J. F. Digonnet and H. J. Shaw, Analysis of a Tunable Single-Mode Fiber-Optic Coupler", *IEEE J. Quantum Electron.*, QE-18, 746, (1982). In particular, the intensity coupling constant $\kappa$ was theoretically determined by the coupler geometry and the adjustable core-to-core separation. Since the directional coupler is a true coupled-mode system formed of two identical waveguides, 100% power transfer from one fiber to the other can be achieved. FIG. 9, adapted from Digonnet and Shaw, shows the theoretical and experimental coupling for a typical coupler having power input to one fiber only. When the top block is offset far from the bottom block (e.g., 15 $\mu$m), the cores 30 and 38 are sufficiently separated so that no coupling occurs. When this offset is approximately 4 $\mu$m, 100% power transfer occurs. With less offset, power is coupled back to the original guide (overcoupling). The coupling may be easily adjusted from 0 to 100%.

The power insertion loss of these couples is low, ranging from 2% to 10%. The directivity is high (>60 dB) and the coupling ratio, once adjusted by the offset, is nearly independent of the input state of polarization.

Figure 10:
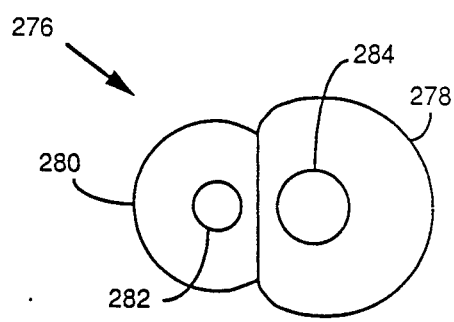

There are several structures possible for providing an asymmetric coupler having the coupling characteristics. FIG. 10 shows a directional coupler 276 formed from a pair of single mode fibers 278 and 280 from which portions of the claddings have been lapped to permit the cores to be placed close enough together to permit evanescent coupling between waves guided by the two fiber cores. The fiber 280 is shown to have a core 282 that is smaller in diameter than the core 284 of the other fiber. The directional coupler 276 formed between the fibers 278 and 280 having different diameters of cores provides a higher coupling efficiency for light input to the smaller core 282. The interaction region of the fibers 278 and 280 is large enough so that the evanescent field of the light in the smaller core 282 interacts with the larger core 284 more effectively than the evanescent field of the light in the smaller core 282 interacts with the larger core 284. The smaller core diameter may be approximately 4$\mu$, and the diameter of the larger core may be about 8$\mu$. An important feature of the coupler configuration of FIG. 10 is that part of the light from the larger core would be coupled into a cladding mode of the smaller fiber rather than coupling into the smaller core 282. The cladding modes may be stripped from the larger fiber by using a fiber having an absorbing jacket 286 formed around its cladding.

Figure 11:
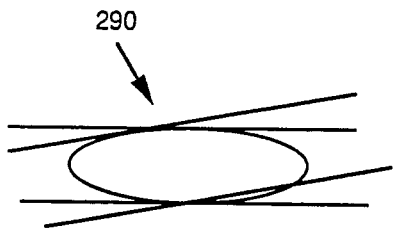
FIGS. 10-12 illsutrate an asymmetric coupler that may be included in the arrays of FIGS. 1 and 7.
Figure 12:
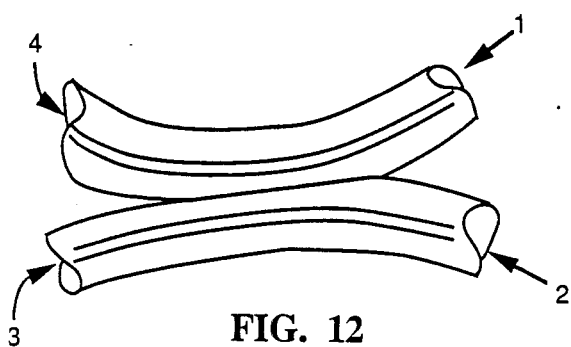

Referring to FIGS. 11 and 12, a coupler 290 may be formed to have an asymmetric coupling region. Coupling occurs in the region of field overlap. The asymmetry of the coupling region provides more efficient coupling in one direction than in the other. FIG. 12 is a side view of a coupler including an interaction region as shown in FIG. 11.

Figure 13:
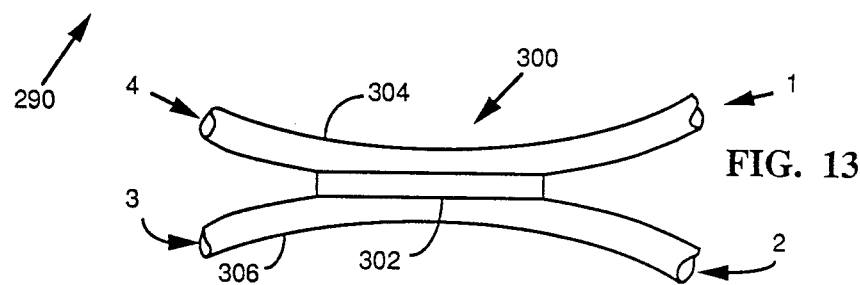
FIG. 13 illustrates another type of asymmetric coupler that may be included in the arrays of FIGS. 1 and 7.

Referring to FIG. 13 an asymmetric coupler 300 may be formed by placing a buffer layer film 302 between flattened portions on a pair of optical fibers 304 and 306. The buffer layer 302 is formed of a material that has greater loss for cross coupling in one direction across the interaction region than for the other direction.

Figure 14:
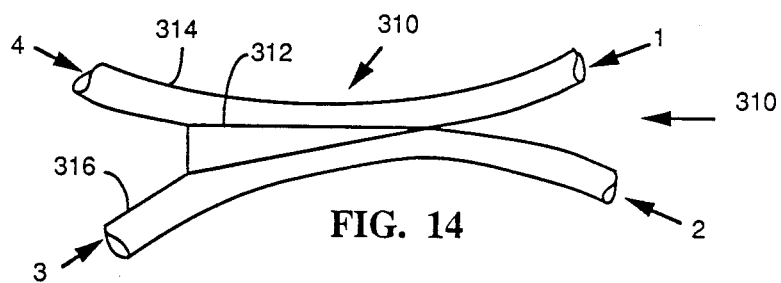
FIG. 14 illustrates another type of asymmetric coupler that may be included in the arrays of FIGS. 1 and 7.

Referring to FIG. 14, a fiber optic directional coupler 310 includes a wedge 312 formed of a crystalline material placed between the flattened portions of a pair of fibers 314 and 316. The wedge 312 makes the interaction region to the fibers asymmetrical about their centers of curvature. Therefore, coupling will be greater for light incidents upon ports 1 and 2 than upon light incident upon ports 3 and 4.

Referring again to FIG. 1, the Michelson interferometer 22A suitable for use as a sensor in the system 20 comprises the fiber optic directional coupler 36A and a sensing fiber coil 40A. The sensing fiber coil 40A terminates at the mirror 42A. Light from the laser 24 is coupled into the optical fiber 34A, which guides the light to port 1 of the coupler 36A. Part of the incident light propagates through the coupler 36A for output at port 2 to the sensing fiber coil 40A. The sensing coil 40A is exposed to the physical parameter being monitored. The mirror 42A reflects the input light signal back through the sensing coil 40A to port 2 of the coupler 36A. The coupler 36A couples a portion of the signal that has been exposed to the parameter being monitored into the fiber 38A. Changes in the parameter cause a phase shift in the light that has propagated through the sensing coil 40A.

Light that does not propagate through the coupler 36A to the sensing coil 40A cross couples into the fiber 38A, which has a free end from which the cross couple light exits the hydrophone array 20.

Figure 15:
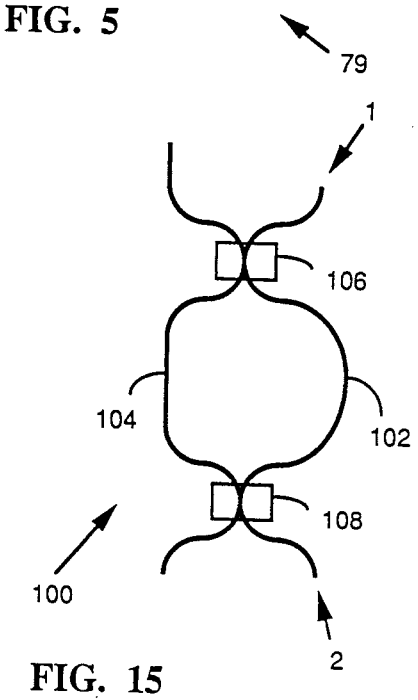
FIG. 15 shows the structure of a Mach-Zehnder interferometer that may be included in the arrays of FIGS. 1 and 7.

Mach-Zehnder interferometers may be used in the hydrophone array 20 instead of the Michelson interferometers 22A. Referring to FIG. 15, each leg of the array may include a Mach-Zehnder interferometer 100 that comprises a pair of optical fibers 102 and 104 and a pair of optical couplers 106 and 108 formed between the fibers 102 and 104. Light from the source (not shown) is coupled into the fiber 102 and propagated to the coupler 106 where a portion of the light couples into the fiber 104. The lengths of the fibers 102 and 104 between the couplers 106 and 108 are preferably different so that there is a phase difference between the light beams that traverse the two fibers. The beams combine in the coupler 108. The output signal at port 2 of the coupler 108 is a superposition of portions of the signals from the Mach-Zehnder interferometer 100. This interference pattern is a function of the phase difference between the beams in the two fibers. The phase difference is a function of the lengths of the portions of the two fibers 102 and 104 between the couplers 106 and 108. Changes in the parameter being measured change the lengths of the fibers 102 and 104 and therefore change the phase difference.

Referring to FIG. 1, the coupling constants of the couplers 32A, 32B, etc. on the input optical fiber 26 and the coupling constants of the couplers 40A, 40B, etc. on the return fiber 46 are weighted such that each sensing interferometer 22A, 22B, etc. receives and returns an equal amount of optical power. In addition to the sensing interferometers 22A, 22B, etc., an additional interferometer 48 is placed in the telemetry line either between the source and the first sensor or between the detector and the first sensor. Although the Mach-Zehnder interferometer 48 is shown, Michelson interferometers could also be used.

The optical path length difference existing at each sensor head at a particular instant of time is determined by sending a pulse of optical energy out on the telemetry fiber 46. A portion of the pulse is tapped off so that it enters each sensor head. At the sensor head coupler, one-half of the pulse is coupled into the long arm of the interferometer, and the remaining half propagates thru the short arm. In traversing the long and short paths, the light picks up the static phase delay existing at that instant of time. The pulse width is chosen such that two distinct, time-separated pulses of light exit from each sensor head. These pulse pairs are returned back toward the detector from each sensor head via a return telemetry fiber. The length of fiber linking each telemetry coupler must be greater than or equal to the pathlength difference of each sensor interferometer in order to prevent overlapping of pulses from successive sensors. In FIG. 1, the reference numeral 49 indicates the returning train of pulses is illustrated. Pulses are labeled S or L depending upon whether they traversed the short sensor arm or the long sensor arm, respectively. The numberical prefix associated with the retrun pulse train indicates from which sensor head each pulse pair is returning from.

To measure differential changes in optical path length in any one of the sensing interferometers 22A, 22B, etc., the S and L pulses must be superimposed in time and photodetected. Passing the pulse pairs through the serially connected interferometer 48 with a pathlength difference identical to the pathlength difference of the sensor head interferometers 22A, 22B, etc. accomplishes this function. This interferometer must be well-isolated from the both the field quantity being measured, and any disturbances that could cause a modulation of the pathlength difference in either the bandwidth or dynamic range of interest.

As shown in FIG. 1, a phase modulator 56 is placed in the long arm of the interferometer 48. It could be placed in either arm and operation would be equivalent. The modulator 56 is operated at a frequency outside the bandwidth of the sensed information, yet no greater than one-half the optical pulse repetition rate. Pulses passing through the leg of the interferometer 48 that contains the phase modulator 56 pick up this high frequency, large amplitude modulation. When the pulse train is superimposed with a time-delayed (or time-advanced) replica of itself and photodetected, the information is shifted up away from the baseband and appears as modulation sidebands about the modulation frequency.

Figure 2:
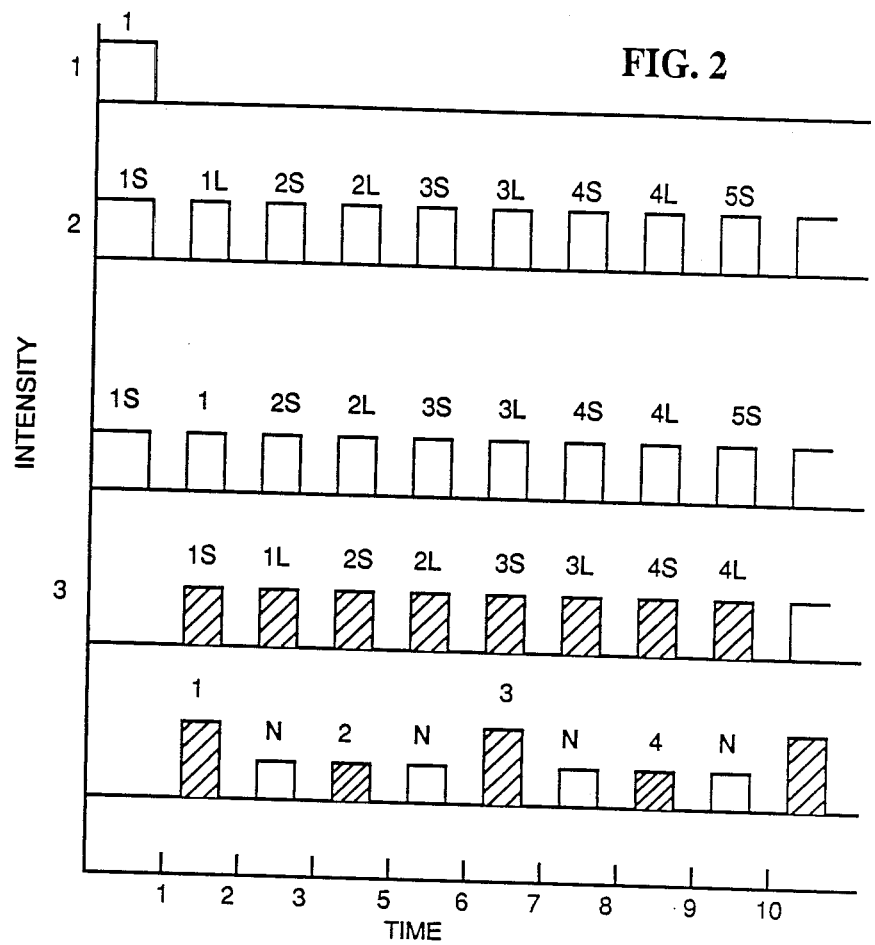
FIG. 2 is a timing diagram illustrating the method of operation of the multiplexed fiber optic sensor system of FIG. 1.

FIG. 2 illustrates this process. Trace 1 is the input optical pulse. Trace 2 is the pulse train which enters the compensating interferometer 48. Trace 3 shows the output this interferometer which traversed the short arm (top), and the long arm (bottom). Shading indicates that the carrier modulation was picked up as well. The lower trace is the resulting photodetected intensity resulting from the summation of these output pulse trains and subsequent photodetection. The distinct pulses labeled 1, 2, 3, . . . contain the sensed information.

Figure 3:
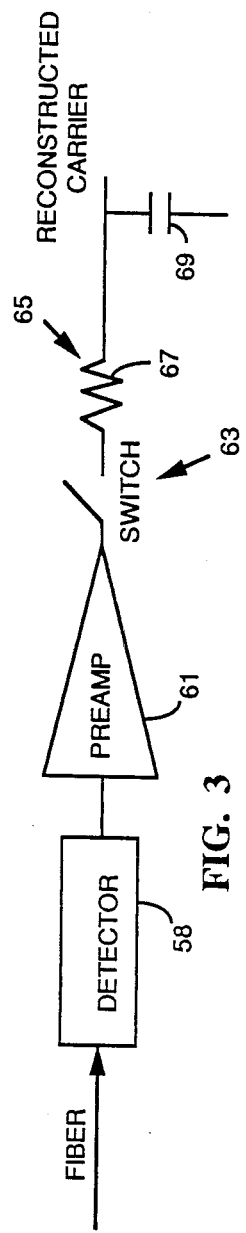
FIG. 3 is a diagram of an electrical circuit for separating a signal output from the system of FIG. 1.
Figure 4:
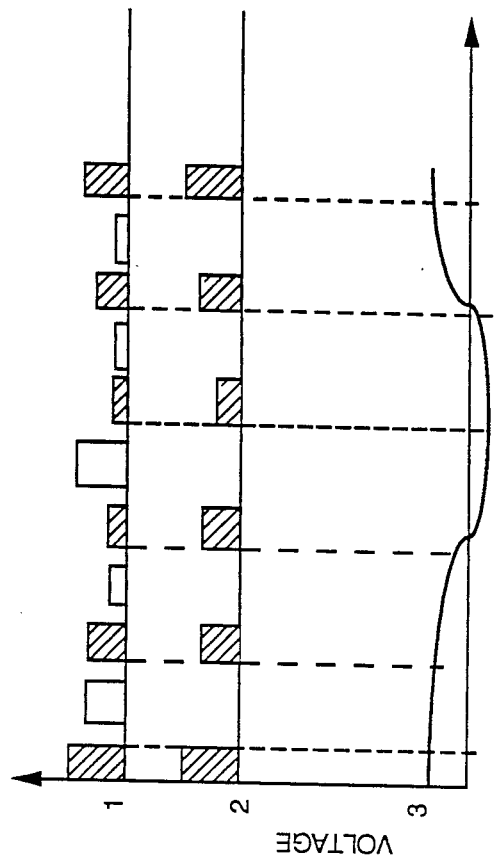
FIG. 4 graphically compares noisy signal pulses with signal pulses having low noise content.

Following photodetection, the pulses containing only the information from each sensor are sifted out with a 1:N multiplexer, where N is the number of sensors. Referring to FIG. 3, the output of the fiber is incident upon the photodetector 58, which produces an electrical signal indicative of the intensity of the fiber optical output signal. The electrical output of the photodetector is input to a preamplifier 61. The amplified output then passes to a switch 63, which when closed allows the signal to pass through a low pass filter 65 that comprises a resistor 67 adn a capacitor 69. The resulting signal is a phase-modulated waveform that can be defined by:

$$v(t) = V_o \cos(B \sin \omega_m t + s(t) + \theta_o). \tag{16}$$

where B is the carrier phase amplitude, $\omega_m$ the carrier phase angular frequency, s(t) the information of interest, and $\theta_o$ the static phase difference between recombining optical beams. Past this point, each individual sensor is demodulated using any of several established demodulation methods.

Figure 7:
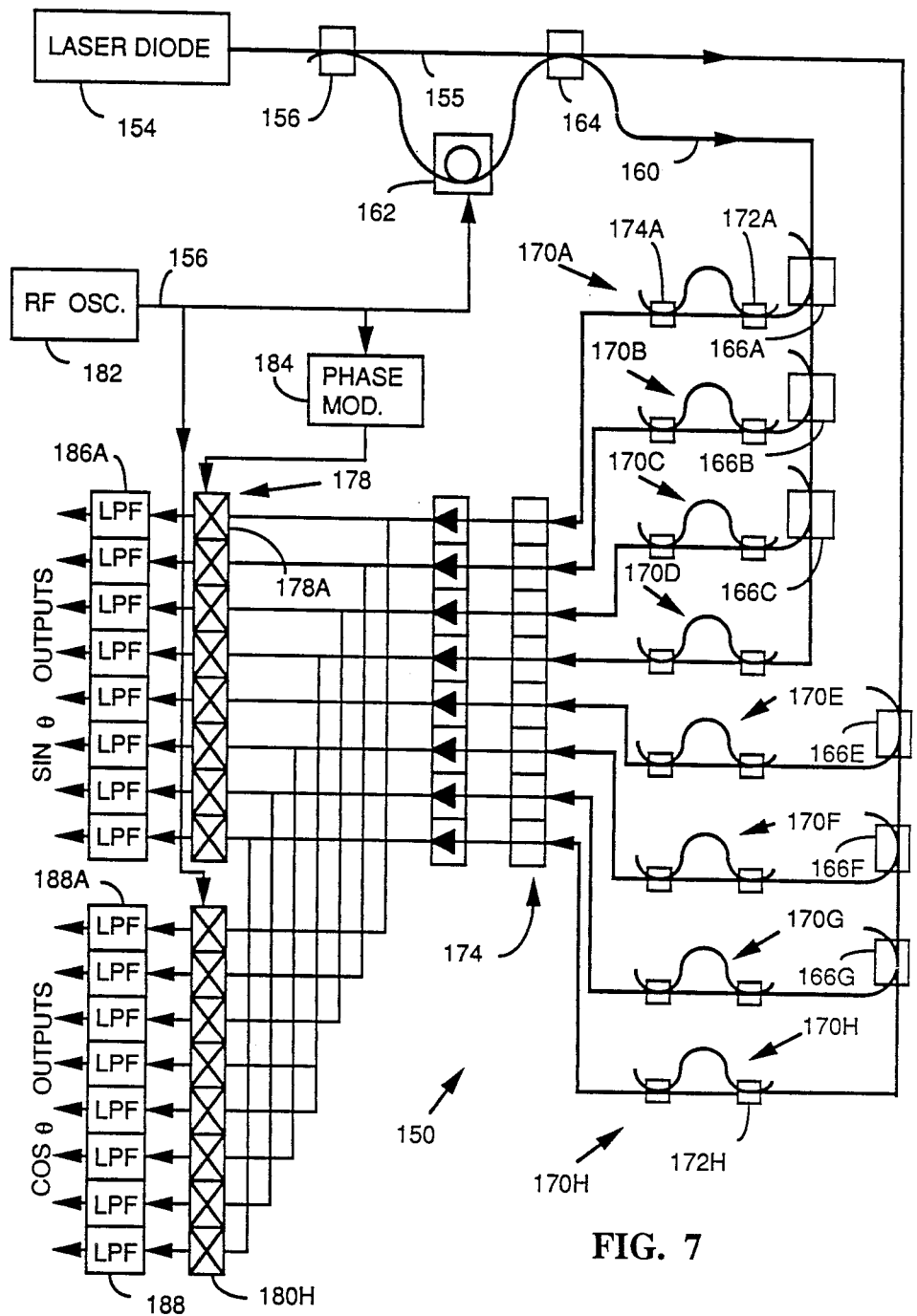
FIG. 7 schematically illustrates a second all fiber optic hydrophone array according to the invention.

A design for a multi-sensor vertical array 150 of fiber optic hydrophones is shown in FIG. 7. The array 150 is powered with a 1.3 mm wavelength laser diode 154, which directly applies an optical signal to a first transmit fiber 156. A fiber optic directional coupler 158 couples light between the first transmit fiber 156 and a second transmit fiber 160. A fiber optic frequency shifter 162 is formed to include the second transmit fiber 160. A second fiber optic directional coupler 164 is formed to couple light between the first and second transmit fibers after the second transmit fiber has passed through the frequency shifter 162. The directional coupler 164 couples light from the first transmit fiber into the second transmit fiber and couples part of the fequency shifted light from the second transmit fiber into the first transmit fiber. Therefore, both the first and second transmit fibers 156 and 160 guide signals of both the frequency $\omega_o$ of the laser diode and the shifted frequency $\omega_o \Delta \omega$.

The examplary embodiment of FIG. 7 includes eight sensing Mach-Zehnder interferometers 170A-170H. The transmit fiber 160 guides light to the first four sensing interferometers 170A-170D of the eight sensor array. Light from the transmit fiber 160 impinges upon a plurality of optical couplers 166A-166C, which couple light into corresponding fibers 168A-168C that form parts of a plurality Mach-Zehnder interferometers 170A-170C. Light remaining in the fiber 160 is guided to an optical coupler 172D that forms part of a Mach-Zehnder interferometer 170D.

The Mach-Zehnder interferometer 170A also includes a pair of couplers 172A and 174A and an optical fiber 176A. Portions of the fibers 168A and 176A between the couplers 172A and 174A have different optical path lengths. Therefore, there is an interference pattern formed when the signals carried by the fibers 168A and 176A recombine in the coupler 174A. An acoustic wave incident upon the fibers causes changes in the path lengths, which changes the interference pattern. These changes may be monitored to determine the amplitude of the acoustic wavefront.

The transmit fiber 156 guides light to couplers 166E, 166F and 166G, which couple light into fibers 168E, 168F and 168G, respectively. These fibers then guide light to Mach-Zehnder interferometers 170E, 170F and 170G, respectively, that comprise couplers 166E, 166F and 166G and optical fibers 176E, 176F and 176G. The light remaining in the second transmit fiber is then directly input to the Mach-Zehnder interferometer 170H via the coupler 172H.

The Mach-Zehnder interferometers 170B-170H are formed similarly to the Mach-Zehnder interferometer 170A. The Mach-Zehnder interferometers 170B-170H therefore include couplers 172B-172H, couplers 174B-174H and fibers 176B-176H connected in the same manner as described above for the Mach-Zehnder interferometer 170A.

The fibers 160, 168A-168F and 156 guide the signals output from the Mach-Zehnder interferometers 170A-170H to a photodiode array 174. The photodiode array 174 inlcudes a plurality of photodiodes so that the output of each interferometer impinges upon a corresponding photodiode. The photodiode array 174 converts the optical signals output from the interferometers 170A-170H into corresponding electrical signals. A preamplifier array 176 receives the electrical signals output from the photodiode array 174. The preamplifier 176 includes a plurality of preamplifiers connected to the photodiodes 174A, 174B, etc., respectively, so that the output of each photodiode is input to a preamplifier.

The signals output from the preamplifier array 176 are input to a pair of mixer arrays 178 and 180. The output of the preamplifier 176A is input to a mixer 178A and a mixer 180A. Similarly, the outputs of the preamplifiers 176B, 176C, etc. are input to mixers 178B and 180B, 178C and 180C, etc.

A radio frequency oscillator 182 drives the frequency shifter 162 and the mixer array 180. The output of the oscillator 182 is also input to a 90° phase shifter 184, which has an output connected to the mixer array 178. Therefore, the mixer arrays 178 and 180 are driven in quadrature.

The outpus of the mixer array 178 are input to a low pass filter array 186, which contains a plurality of low pass filters 186A, 186B, etc. The outputs of the mixers 180A, 180B, etc. are input to the low pass filters 188A, 188B, etc., respectively. The low pass filters 186A, 186B, etc. are proportional to the sines of the phase shifts of the interferometers. The outputs of the mixers 180A, 180B, etc. are input to a low pass filter array 188, which contains a plurality of low pass filters 188A, 188B, etc. The low pass filters 186A, 186B, etc. are proportional to the cosines of the phase shifts of the interferometers. Each photodiode output is amplified in a separate preamplifier, as shown in FIG. 7. Each preamp output then feeds a pair of electronic mixers. The signal is mixed with an in-phase replica of the RF oscillator in one mixer, and a quadrature replica in the other. After low pass filtering, the mixer outputs result in the sin $\theta$ and cos $\theta$ of the sensor-induced phase modulation, which is a direct result of the acoustic signal.

For each hydrophone, there is a sin $\theta$ output and cosine $\theta$ output. All of the outputs are then multiplexed onto the telemetry during each sampling interval, which, for a 500 Hz bandwidth, will be approximately 1 ms.

With present technology, an optical input power level of about 10 mW (+10 dBm) can be easily achieved. The laser diode 154 is operated continuously (CW). The light input to the fiber 156 is immediately split equally with thea 2×2 fiber optic coupler 158 and directed simultaneously into a short (S) and a long (L) path. The outputs from these paths are recombined in the second 2×2 coupler 164. The pathlength difference is generally on the order of a few tens of meters. The in-line fiber optic frequency shifter 162 performs the function of determining the optical pathlength difference between the couplers 158 and 164. Alternatively a phase modulator 200 driven by a sawtooth wave can be substituted for the frequency shifter. Fiber optic frequency shifters are described subsequently with reference to FIGS. 16-22 and the phase modulator 200 is described with reference to FIGS. 23-25.

Since the pathlength difference of the network is much greater than the laser coherence length (typically 10-20 cm), the two beams recombine incoherently at the second 2×2 coupler 164, and no beat signal is observed at the difference frequency (normally RF). The second coupler 164 has two identical outputs, each of which carries half of the power from the short and long fiber paths. Each line is used to power one-half of the sensors in the array.

Assume, for illustration, that the cable connecting the laser source 154 to the sensors is 1 km long. Presently, single mode fiber cables exhibiting losses less than 0.5 dB/km are available so power loss in the cable is essentially negligible. Each individual sensor receives a fraction of the total optical power via the fiber optic coupler 164 from one of the two output lines 156 or 160.

For a given number of sensors on a single fiber, the optimum power deliverable to each sensor has been calculated. For a low-loss system (fiber loss plus coupler loss), the optimum power in decibels referred to the input is approximately $-10 \log N$, where N is the number of interfeometers in the system. Results are presented in Table 1 for various values of N. Because the fiber path between couplers is so short that fiber losses are negligible, a finite loss of 0.1 dB per coupler is assumed. In addition to the delivery loss, a 3 dB loss is taken at each sensor because only one of the sensor's two outputs is being utilized. This is included in the numbers shown in Table 1.

TABLE 1

SENSOR ARRAY POWER BUDGET*

| Sensors On Single Bus (N) | Total Sensors In Array (2N) | $10 \log(P_{Sen}/P_{in})$ | Total Losses Including 3 dB Sensor Loss | Output Power (in μW) From Each Sensor, Assuming 10 mW Laser |
|---|---|---|---|---|
| 4 | 8 | −6.3 dB | −9.3 dB | 587 μW |
| 8 | 16 | −9.5 | −12.5 | 281 |
| 16 | 32 | −12.9 | −15.9 | 129 |
| 32 | 64 | −16.8 | −19.8 | 52 |
| 64 | 128 | −21.7 | −24.7 | 17 |

*Output power per sensor referenced to input, for an array of 2N sensors. Coupler loss 0.1 dB. Last column assumes 10 mW source, 5 mW into each output fiber.

Figure 8:
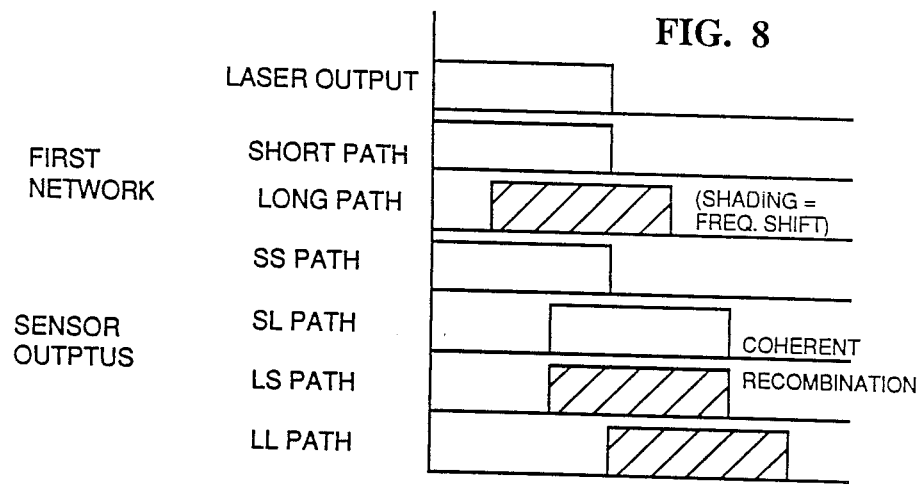
FIG. 8 graphically illustrates timing and delay relationships for the hydrophone array of FIG. 7.

Four possible paths exist from the laser to the photodetector. They are, in the order that the signals arrive, short-short (SS), short-long (SL), long-short (LS), and long-long (LL). For matched networks the SL and LS signals arrive simultaneously at the detector array and coherently recombine. Since only the LS light is affected by the frequency shifter the acoustic signal appears as a phase modulation on this RF carrier signal. A timing diagram showing the relationship of the four terms is presented in FIG. 8. Pulsed signals are assumed for clarity.

The frequency shifter 162 must be isolated from the environment, since signals or other pressures acting upon it could produce optical phase shifts that would be indistinguishable from those affecting the sensing interferometers 170A-170G. The entire predelay network including the couplers 158, the frequency shifter 162 and the coupler 164 are preferably sealed within a rigid cannister (not shown).

There are several types of optical frequency shifters that may be used in the present invention. FIG. 16 illustrates the effect of a frequency shifter on an optical wave. Consider a circularly polarized input light incident upon a half-wave plate 400 that is rotating at an angular velocity f. The input wave is shown to have a frequency $f_o$. The wave is traveling in the positive z-direction and has polarization vectors along the x- and y-axes that are of equal magnitude and 90° out of phase. Therefore, the polarization vector appears to rotate at angular velocity $f_o$ about the z-axis in a clockwise direction when viewed looking toward the direction of propagation. The half-wave plate 400 rotates in the same direction as the polarization vector so that the output wave is frequency shifted from the input frequency $f_o$ to have a frequency of $f_o+2f$.

FIG. 17 graphically represents the possible frequency outputs from the frequency shifter 162 when it is operated as a single-side-band-suppressed-carrier phase shifter. If the input frequency is $f_o$, then rotating the half-wave plate at frequency f in the direction of polarization of the input beam produces an output of $f_o+2f$. Rotating the half-wave plate 400 at the frequency f opposite in direction to the polarization of the circularly polarized input wave produces an output frequency of $f_o-2f$. Controlling the rotational frequency f permits the output frequency of the quarter-wave plate to have a range of $f_o \pm 2f_{max}$ is the maximum rotational frequency of the half-wave plate 400.

The amplitude of the outputs of the frequency shifter 162 is $$\phi(t) = A \exp [i(f_o+2f)t] + B \exp [if_o t]. \qquad (17)$$

The intensity of the output wave is the square of the amplitude and is given by $$I = |\phi(t)|^2 \qquad (18)$$
$$= A^2 + B^2 + 2AB \cos(2 ft). \qquad (19)$$

The coefficient A is ordinarily much larger than B so that $B^2$ is negligible.

A frequency shifter structure that may be used in the array 20 of FIG. 1 and the array 150 of FIG. 7 is shown in FIG. 19. The frequency shifter 162 may include a length 422 of the optical fiber 160 retained between a block 423 that may be formed of quartz and a wedge 424 formed of a material such as aluminum. A metallic layer comprising Cr-Au, for example, is formed on the surface 427 of the wedge 424, and a transducer 430 formed of PZT, for example, is mounted to the metallic block 424. The transducer 430 may be driven by a suitable oscillator (not shown) to launch an acoustic wave at an angle θ in the fiber.

The fiber 162, being a single mode fiber, supports two orthogonal polarizations of the single propagation mode. There are two polarizations because the fiber is birefringent, having different refractive indices for different directions of the electric field in the fiber. The two polarizations are normally uncoupled so that there is no energy transfer from one polarization to the other. A spatially periodic stress pattern imposed on the fiber induces coupling between the two polarizations, leading to power transfer therebetween. It has been found that the power transfer is cumulative only if the spatial period of the stress pattern equals the beat length of the fiber. Referring to FIG. 18, the beat length of the optical fiber is $L_B = \lambda/\Delta n$, where $\Delta n$ is the difference in the refractive indices for the two polarizations and $\lambda$ is the optical wavelength. It has been found that a stress pattern is most effective in causing coupling of the two polarizations when the stress is directed at 45 degrees to the principal axes of birefringence.

The transducer 430 forms a moving stress pattern in the fiber portion 422 by means of the traveling acoustic wave. If the stress pattern moves along the fiber, light coupled from one polarization to the other is shifted in frequency by an amount equal to the frequency of the moving stress pattern because of the motion of the coupling region. For convenience of reference, one of the polarizations will be referred to as "slow;" and the other polarization will be referred to as "fast." The velocity of a light wave in a dielectric medium is the free space velocity of light divided by the refractive index of dielectric; or $v=c/n$. Therefore, it may be seen that a birefringent medium the polarization for which the refractive index is the greater is the slow wave; and the polarization for which the refractive index is smaller is the fast wave.

Referring to FIG. 18, a plane acoustic wavefront of wavelength $\lambda_a$ incident upon the fiber portion 422. Phase matching occurs when the component of the beat length $L_B$ in the direction of propagation of the acoustic wave equals the acoustic wavelength. Therefore, from FIG. 18 it is seen that $L_B \sin \theta = \lambda_a$. Using a well-known relation between wave velocity, frequency and wavelength to eliminate the acoustic wavelength from the preceding equation gives the acoustic frequency as $f = v(L_B \sin \theta)$, where v is the acoustic wave velocity in the fiber.

The specific nature of the interaction of between the acoustic wave and the two optical polarizations propagated by the fiber can be demonstrated using frequency-wave number diagrams. Referring to FIG. 20, if the acoustic wave travels in the same direction as the light in the fiber 162, light polarized in the fast mode and having frequency $\omega$ couples to the slow mode with the resulting wave having a frequency $\omega + \omega_a$, where $\omega_a$ is the acoustic wave frequency. Light propagating in the slow mode couples to the fast mode and shifts in frequency to $\omega - \omega_a$.

As shown in FIG. 21, if the acoustic wave propagates in a direction opposite to that of the light in the fiber 162, the frequency shifting characteristics of the system reverse. Specifically, light propagating in the fast mode couples to the slow mode with a change in frequency to $\omega - \omega_a$; and light propagating in the slow mode couples to the fast mode with a change in frequency to $\omega + \omega_a$.

Therefore, the frequency shifter 420 is a single side band frequency shifter if only light of a single polarization impinges upon the portion of the fiber 162 having the periodic moving stress pattern therein. In practice, the selected polarization may have small amounts of the carrier frequency and the sideband having the opposite frequency shift because of the finite extinction ratio of the polarizers included in the gyroscope and other factors.

Referring to FIG. 22, a frequency shifter 450 that may be included in the array 150 comprises a length of the fiber 162 mounted in a grooved substrate 452. An electrode 454 is mounted in the groove 456 below the fiber 162. A portion of the fiber cladding 460 is ground away to form an interaction region 461 near the core 462. An interaction material 464 formed of an electrooptically active material is mounted on the region of the fiber where the cladding was removed. A pair of electrodes 466 and 468 are mounted on opposite ends of the interaction material, and an electrode 470 is mounted on the interaction material in generally parallel alignment with the electrode 456. An oscillator 472 supplies voltage to the electrode 470. A phase shifter receives the oscillator output, shifts its phase and then applies the phase shifted signal to the electrode 468. the electrodes 466 and 456 are grounded.

Application of the oscillator signal to the interaction material 464 changes its refractive index according to the electrooptic effect. These changes in refractive index in the interaction material 464 cause changes in the effective refractive of the fiber 162. These changes are oscillatory at the frequency of the oscillator signal. Since the speed of light is $v=c/n$ where n is the refractive index of the fiber, the changes in refractive index modulate the velocity of optical signals in the frequency shifter 450. These velocity modulations are seen as modulations in the frequency of the light.

Figure 23:
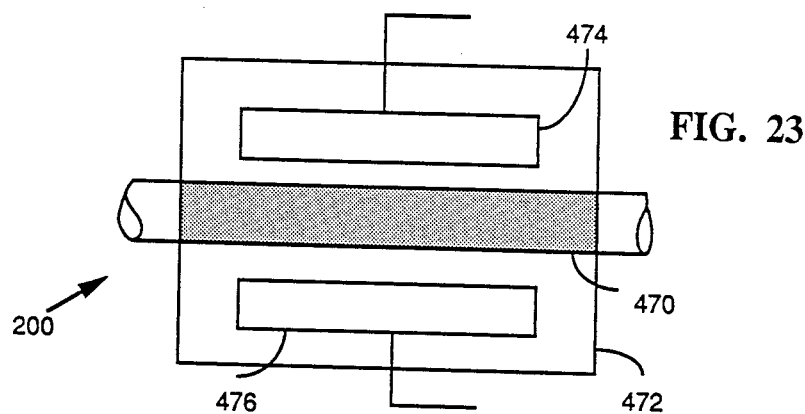
FIG. 23 is plan view of a phase modulator that may be included in the arrays of FIGS. 1 and 7.
Figure 24:
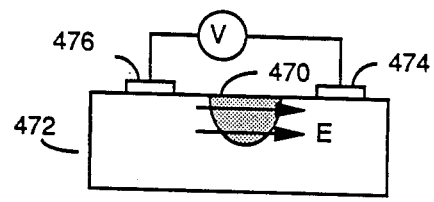
FIG. 24 is an end elevation view of the phase modulator of FIG. 22.

Referring to FIG. 23, the phase modulator 200 may comprise an optical waveguide 470 formed on a substrate 472 of an electrooptically active material such as lithium niobate. A pair of electrodes 474 and 476 are attached to the substrate 472 on opposite sides of the waveguide 470. The electrodes 474 and 476 may be formed on the substrate 472 by vapor deposition of aluminum. The optical waveguide 470 may be formed in the substrate 472 by first depositing a strip of titanium on the substrate 480 and heating it to drive the titanium into the substrate 472. The resulting waveguide 470 has a generally semicircular cross section as shown in FIG. 24. The fiber 162 must be cut to have two ends 162A and 162B that are butt coupled to opposite sides of the optical waveguide 470 as shown in FIGS. 23 and 24.

Application of a voltage across the electrodes changes the refractive index of the optical waveguide 21 by means of the electrooptic effect. The transit time of a light wave through the waveguide 21 is the product of the length of the waveguide and its refractive index divided by the speed of light in vacuum. Changing the refractive index of the optical waveguide 21 that changes the transit time of an optical signal through it. Because of the sinusoidal nature of the electromagnetic fields that comprise the light wave, the change in transit time is seen as a change in phase of the wave.

Although the invention has been described with reference to certain preferred embodiments, the scope of the invention is not limited to the particular embodiments described. Rather, the scope and spirit of the invention are defined by the appended claims and equivalents thereof.

I claim:
1. A low power all fiber optic hydrophone array, comprising:
an optical signal source;
a transmitting optical fiber for guiding signals output from the optical signal source;
a plurality of sensing interferometers coupled to the transmit optical fiber, each sensing interferometer having a short arm and a long arm;
a receive fiber coupled to each of the sensing interferometers; and
means for measuring differential changes in the optical path of each sensing interferometer, including:
means for superimposing signals output from each sensing interferometer;
a detector for converting optical signals in the receive fiber into electrical signals
a transmit interferometer formed in the transmit fiber between the optical source and the sensing interferometer; and means formed in the transmit interferometer for modulating the optical waves.

2. The hydrophone array of claim 1 wherein each sensing interferometer has a pair of sensing optical paths having a predetermined path difference therebetween and wherein the transmit interferometer has a pair of optical paths that have the same path difference as the predetermined path difference of each sensing interferometer.

3. The hydrophone array of claim 1, further including:
   a detector array that includes a detector corresponding to each sensing interferometer for producing output electrical signals indicative of optical signals output from each of the sensing interferometers;
   a first mixing array connected to the detector array to receive electrical signals output therefrom;
   a second mixing array connected to the detector array to receive electrical signals output therefrom;
   oscillator means for driving the frequency shifter, said oscillator means being connected to the second mixing array, the second mixing array providing outputs indicative of the sines of the phase differences of the sensing interferometers; and
   phase shifting means connected between the oscillator means and the first mixing array, the first mixing array providing outputs indicative of the cosines of the phase differences of the sensing interferometers.

4. A method for forming a low power all fiber optic hydrophone array, comprising the steps of:
   providing an optical signal source;
   guiding signals output from the optical signal source along a transmit optical fiber;
   coupling a plurality of sensing interferometers to the transmit optical fiber;
   forming each sensing interferometer to have a short arm and a long arm;
   coupling a receive fiber to each of the sensing interferometers; and
   measuring differential changes in the optical path of each sensing interferometer by the steps of:
   superimposing signals output from each sensing interferometer;
   converting optical signals in the receive fiber into electrical signals;
   forming a transmit interferometer in the transmit fiber between the optical source and the sensing interferometers; and
   forming optical wave modulating means in the transmit interferometer.

5. The method of claim 4 further including the steps of:
   forming each sensing interferometer to have a pair of sensing optical paths having a predetermined path difference therebetween; and
   forming the transmit interferometer to have a pair of optical paths that have the same path difference as the predetermined path difference of each sensing interferometer.

6. The method of claim 4, further including the steps of:
   forming a detector array that includes a detector corresponding to each sensing interferometer for producing output electrical signals indicative of optical signals output from each of the sensing interferometers;
   connecting a first mixing array to the detector array to receive electrical signals output therefrom;
   connecting a second mixing array to the detector array to receive electrical signals output therefrom;
   driving the frequency shifter with the oscillator means, connecting the oscillator means to the second mixing array, so that the second mixing array provides outputs indicative of the sines of the phase differences of the sensing interferometers; and
   connecting the phase shifting means between the oscillator means and the first mixing array so that the first mixing array provides outputs indicative of the cosines of the phase differences of the sensing interferometers.

* * * * *